(12) United States Patent  
Chang

(10) Patent No.: US 7,136,687 B2
(45) Date of Patent: Nov. 14, 2006

(54) ELECTRICAL DEVICE FOR ADJUSTING THE ANGLE BETWEEN A TOP MODULE AND A BOTTOM MODULE

(75) Inventor: Ming-Shiung Chang, Taipei Hsien (TW)

(73) Assignee: Chi Mei Communication Systems, Inc., Tai-nan County (TW)

( * ) Notice: Subject to any disclaimer, the term of this patent is extended or adjusted under 35 U.S.C. 154(b) by 0 days.

(21) Appl. No.: 10/905,130

(22) Filed: Dec. 16, 2004

(65) Prior Publication Data

US 2006/0133027 A1 Jun. 22, 2006

(51) Int. Cl.
*H04M 1/00* (2006.01)

(52) U.S. Cl. .............................. 455/575.3; 455/550.1; 455/575.1; 455/575.8; 379/433.11; 379/433.12; 379/433.13

(58) Field of Classification Search ................ 345/649; 379/330, 428.01, 428.03, 433.04, 433.11, 379/433.12, 433.13; 455/90.3, 95, 550.1, 455/575.1, 575.8
See application file for complete search history.

(56) References Cited

U.S. PATENT DOCUMENTS 6,549,789 B1* 4/2003 Kfoury .................... 455/550.1
2004/0090740 A1* 5/2004 Tseng et al. ................ 361/683

FOREIGN PATENT DOCUMENTS

TW 547690 8/2003

* cited by examiner

*Primary Examiner*—Joseph Feild
*Assistant Examiner*—Jaime Holliday
(74) *Attorney, Agent, or Firm*—Jeffrey T. Knapp

(57) ABSTRACT

An electrical device including a top module having a panel for displaying an image, a bottom module having a plurality of buttons for controlling the operation of the electrical device, a base affixed on the bottom module, a pivot formed on the base having a buckle for buckling the top module which is capable of rotating around the buckle, a stop block for stopping the top module, and a track surrounding the base for allowing the stop block to move along the track.

9 Claims, 7 Drawing Sheets

ELECTRICAL DEVICE FOR ADJUSTING THE ANGLE BETWEEN A TOP MODULE AND A BOTTOM MODULE

BACKGROUND OF INVENTION

1. Field of the Invention

The present invention relates to an electrical device, and more specifically, to an electrical device that forms a specific angle between a top module and a bottom module as the top module is unfolded.

2. Description of the Prior Art

With the popularization of convenient mobile phone devices for routine communication among people in the modern information society, people are able to exchange information, sharing experiences and communicating with each other anywhere and anytime. Conventional mobile phones have integrated more and more functions, such as listening to broadcasts, playing games, taking photos, and receiving electronic mail and SMS messages. In other words, mobile phones are not just communication tools but also portable electronic devices with multiple functions.

Please refer to FIG. 1, which is a diagram of the mobile phone 10 according to prior art. The mobile phone 10 contains a top module 12 having a display panel 11 for displaying images, a bottom module 14 having a plurality of buttons 18 for controlling the operation of the mobile phone 16, and a connection device 16 for rotatably unfolding the top module 12 and the bottom module 14 by the angle of 180 degrees between the top module 12 and the bottom module 14 as shown in FIG. 1. Because the aspect ratio of length to width for images displayed by the display panel 11 in the condition which FIG. 1 illustrates is 16:9 (or 4:3), that is, the width is narrower, it is desirable to be able to rotate the mobile phone 10 to another orientation so that the aspect ratio of length to width for images displayed by the display panel 11 is 9:16 (or 3:4). It is more suitable for a user to read text, for example electronic mail, in such a display image ratio. It is not ergonomically suitable for a mobile phone to have an included angle of 180 degrees between the top module 12 and the bottom module 14. For that reason, it is desirable to improve the mobile phone.

SUMMARY OF INVENTION

It is therefore a primary objective of the claimed invention to provide an electrical device that not only allows the top module to rotate relative to the bottom module around two different axes, but also to set the included angle between the top module and the bottom module to be around 160 degrees to suit the ergonomics of a mobile phone when the top module has been opened.

According to the claimed invention, an electrical device comprises a top module having a panel for displaying an image, a bottom module having a plurality of buttons for controlling the operation of the electrical device, a base affixed on the bottom module, a pivot formed on the base having a buckle for buckling the top module which is capable of rotating around the buckle, a stop block for stopping the top module, and a track surrounding the base for allowing the stop block to move along the track.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
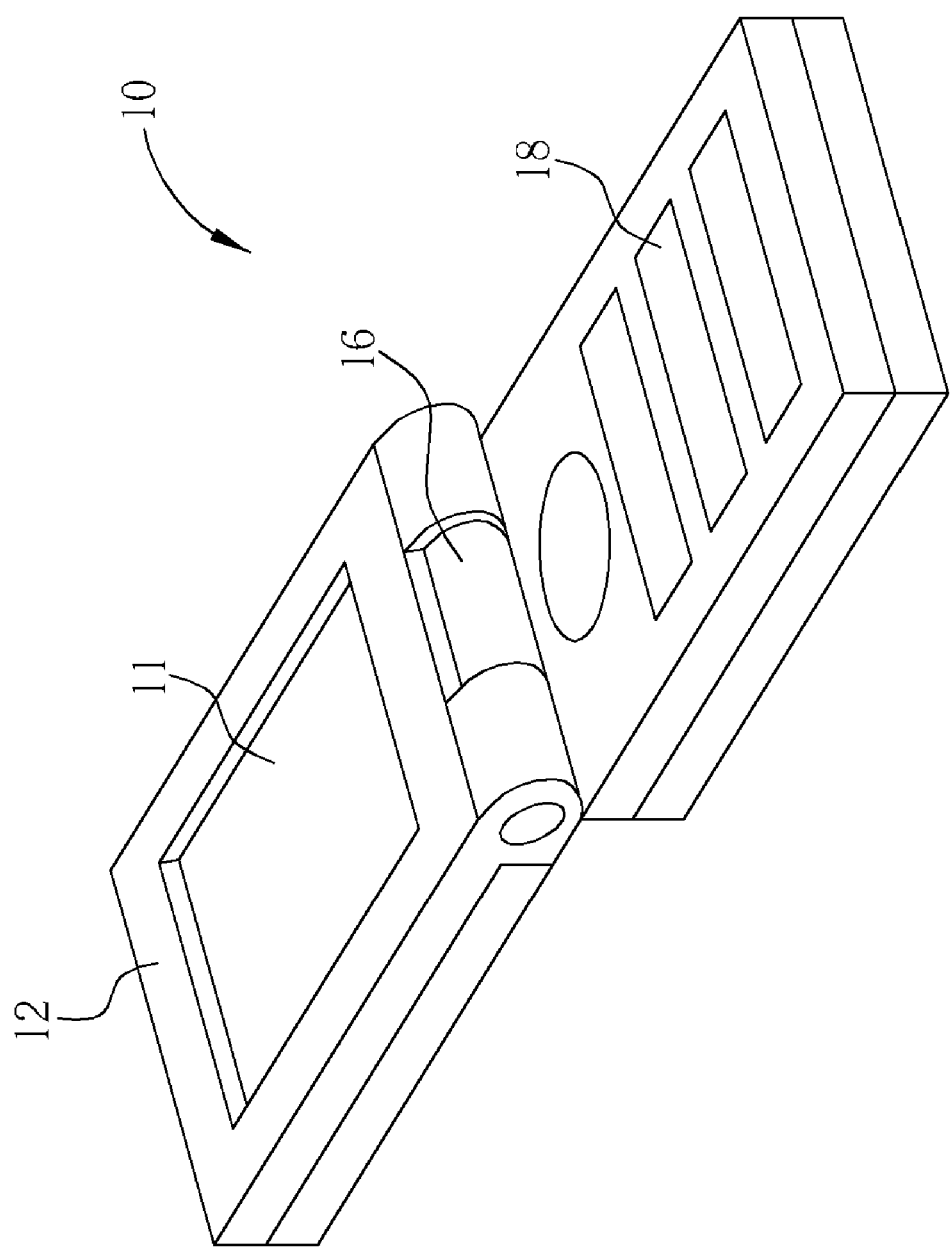
FIG. 1 is a diagram of a mobile phone according to the prior art.
Figure 2:
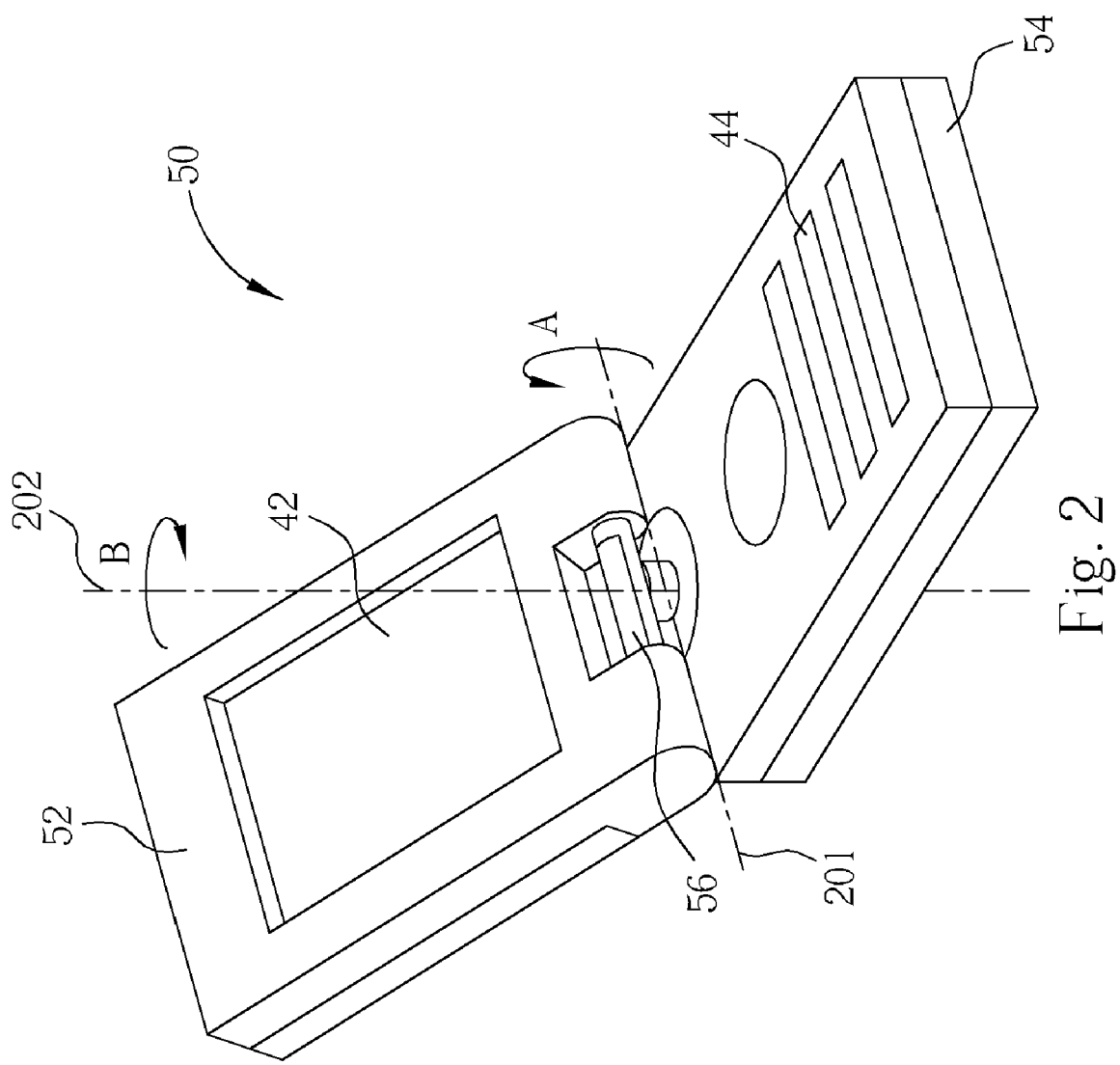
FIG. 2 shows a mobile phone according to the present invention.
Figure 3:
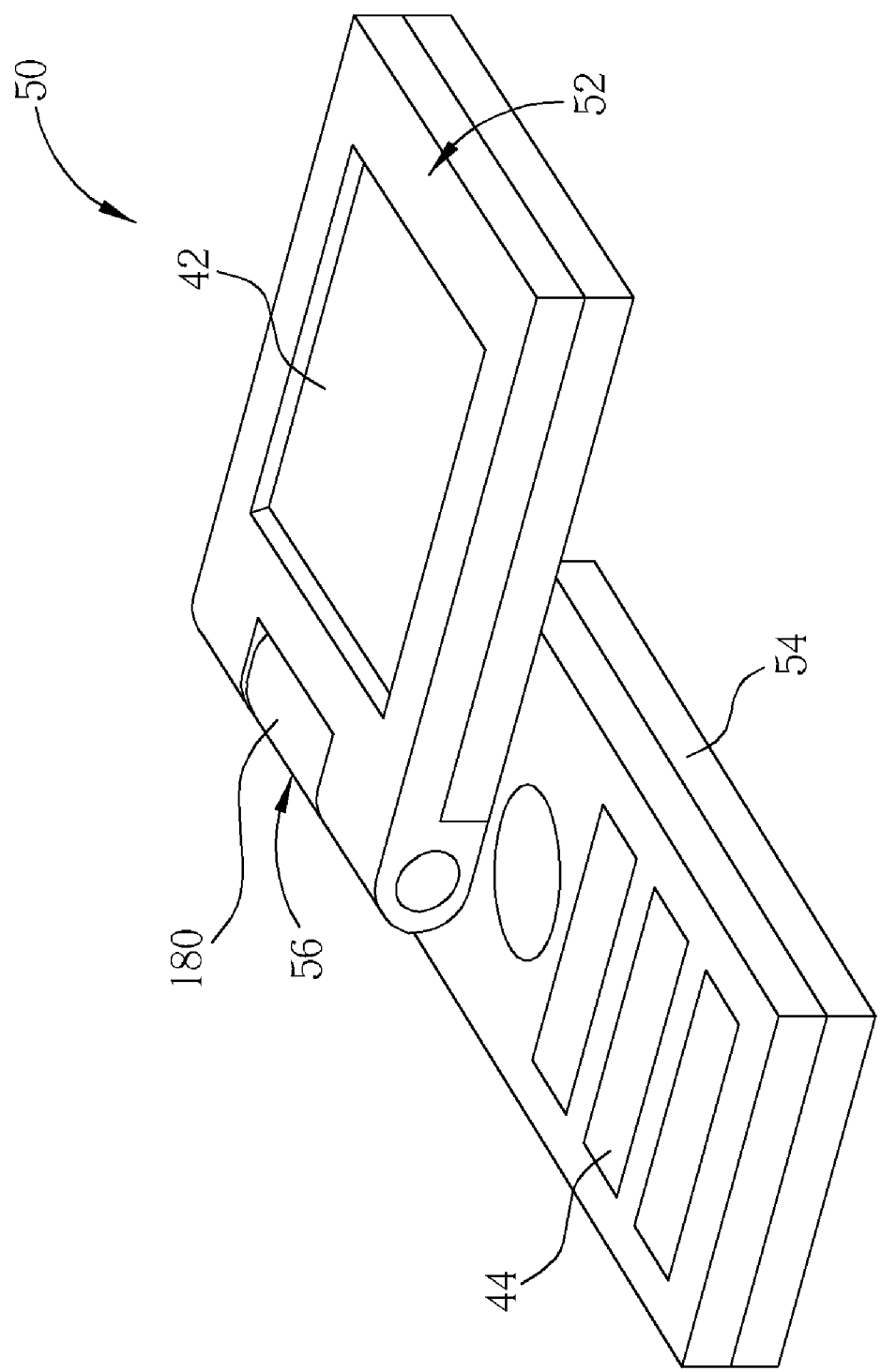
FIG. 3 is a diagram showing the top module of the mobile phone rotated 90 degrees around the axis indicated by the arrow B.

Please refer to FIG. 2 and FIG. 3. FIG. 2 shows a mobile phone 50 according to the present invention. FIG. 3 is a diagram showing the top module 52 of the mobile phone 50 after being rotated 90 degrees around the axis indicated by the arrow B shown in FIG. 2. The mobile phone 50 contains a top module 52 having a panel 42 for displaying an image, a bottom module 54 having a plurality of buttons 44 for controlling the operation of the mobile phone 50, and a connection device 56 for coupling the top module 52 to the bottom module 54. The included angle between the top module 52 and the bottom module 54 will be 160 degrees after the top module 52 rotates along the arrow A shown in FIG. 2. Then, the top module 52 can be rotated 90 degrees around the axis indicated by arrow B to the position shown in FIG. 3. As shown in FIG. 3, the mobile phone 50 further comprises a pivot protection cover 180 for enclosing the components in the connection device 56 to protect the components from dirt or outside damage and for aesthetic reasons. For simplicity and clarity, the pivot protection cover 180 is only shown in FIG. 4.

Figure 4:
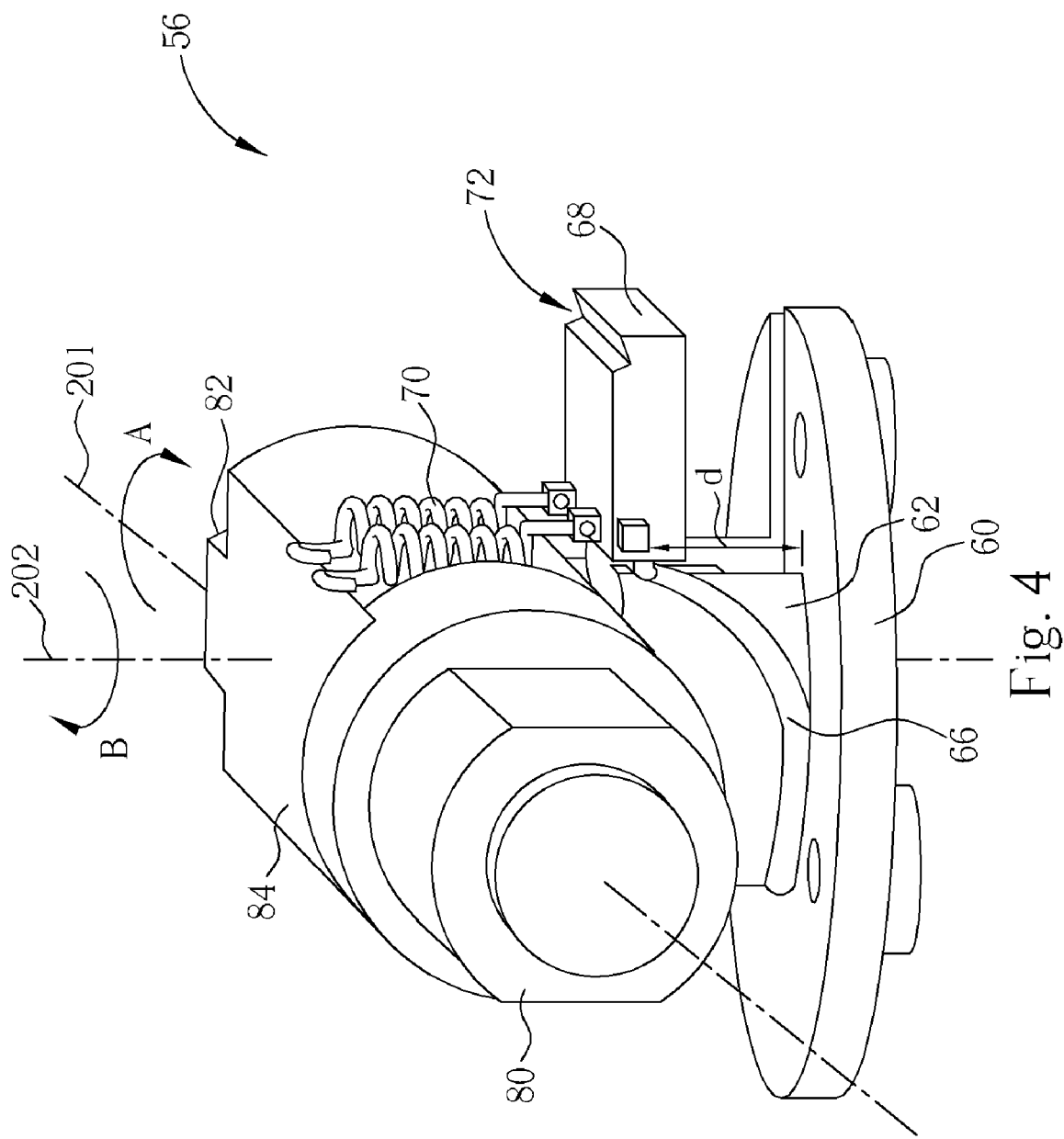
FIG. 4 is a structural diagram of the connection device depicted in FIG. 2.
Figure 5:
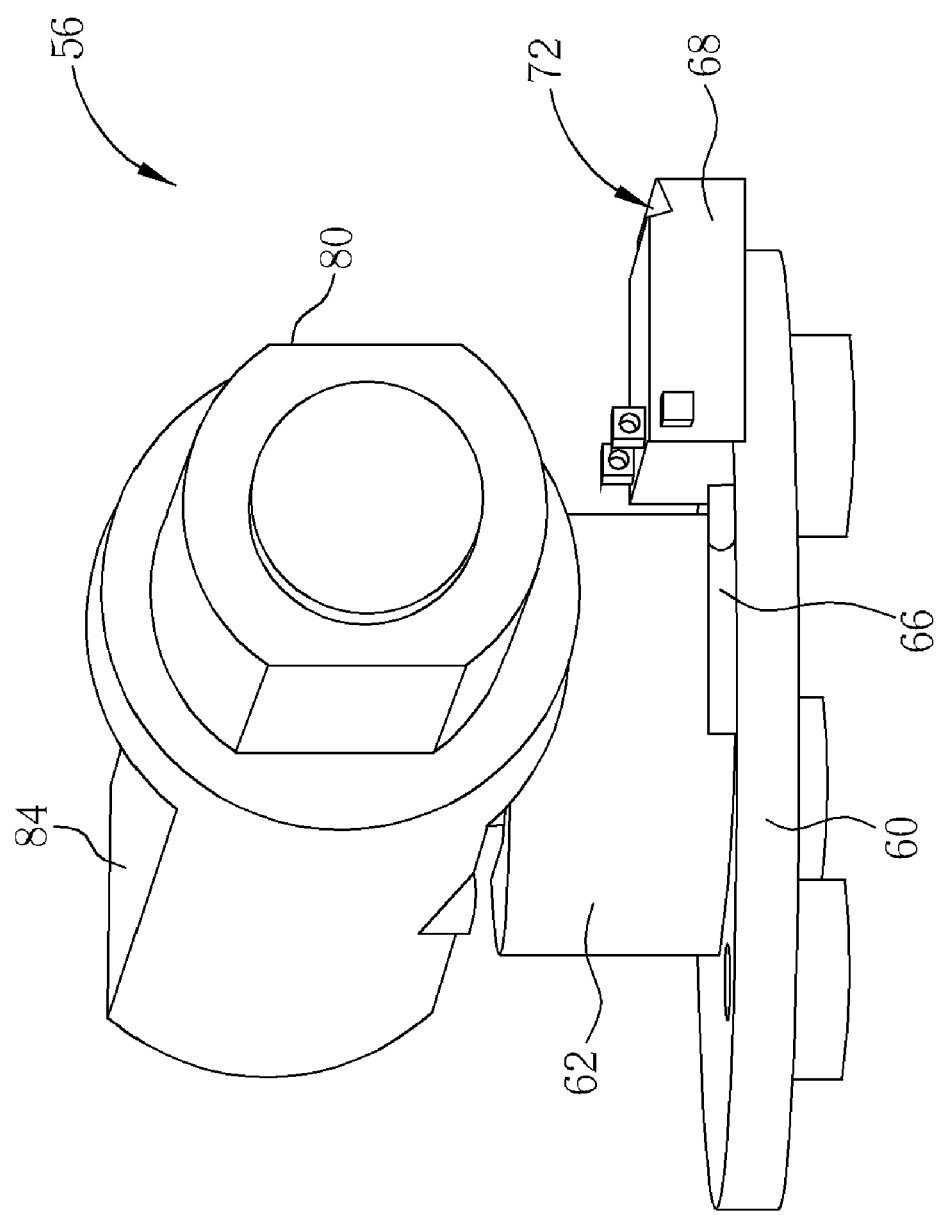
FIG. 5 is a diagram showing the connection device in FIG. 4 after moving along the track.
Figure 6:
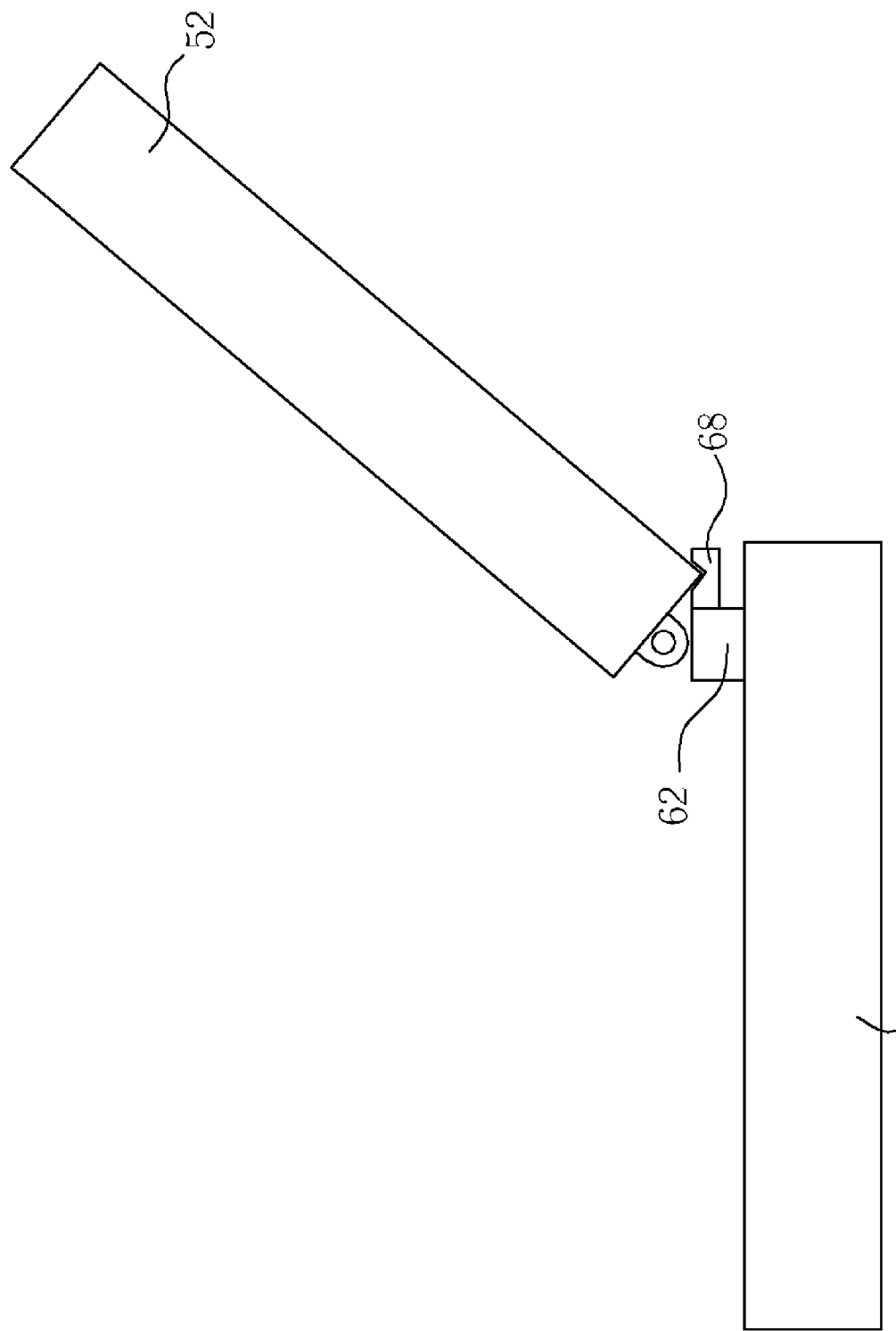
FIG. 6 and FIG. 7 are diagrams showing the top module and the bottom module in relation with the connection device.
Figure 7:
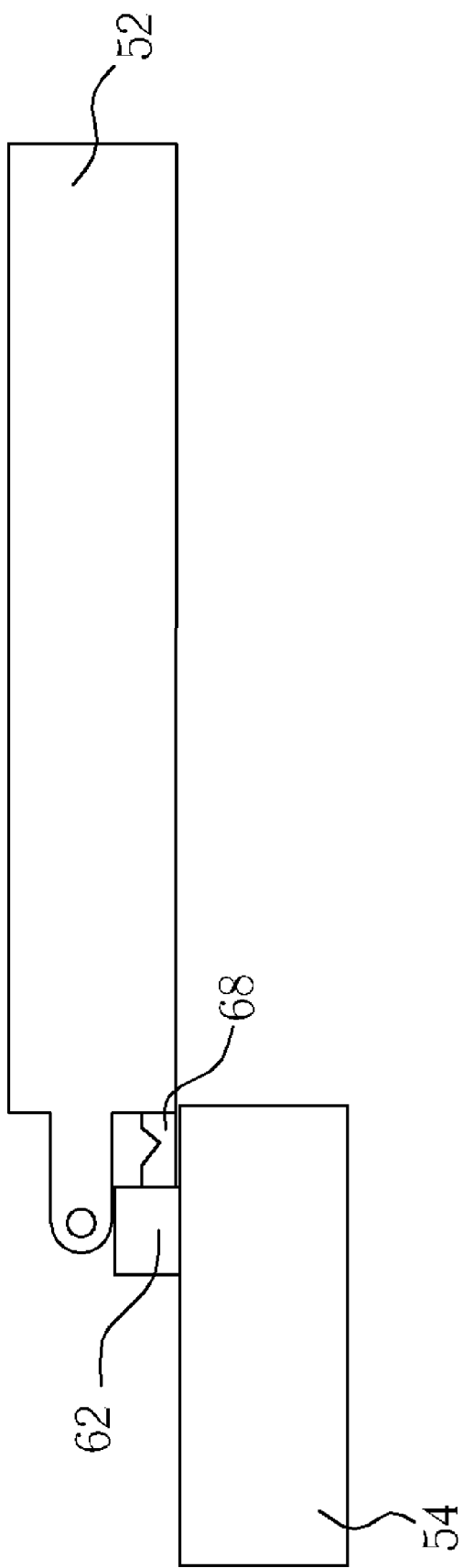

Please refer to FIGS. 4–7. FIG. 4 is a structural diagram of the connection device 56 depicted in FIG. 2. FIG. 5 is a diagram showing the connection device 56 in FIG. 4 after moving along the track 66. FIG. 6 and FIG. 7 are diagrams showing the top module 52 and the bottom module 54 in relation with the connection device 56. The connection device 56 contains a base 60 fixed to the bottom module 54. The base 60 includes a pivot 62 with a first buckle 80 and second buckle 82 both for coupling the top module 52 to the pivot 62. The top module 52 is able to rotate around the first axis 201 in the direction of arrow A. The pivot 62 includes a track 66 with one end substantially against the base and the other end rising to a height above the base of d. A stop block 68 is shidably installed on the track 66. One end of a flexible component 70 (e.g., a spring) is connected to the stop block 68, and the other end of the flexible component 70 is affixed to the rotation member 84 or to the pivot protection cover 180 (illustrated in FIG. 3). One side of the top module 52 is engaged in groove 72 on the stop block 68 while the top module 52 rotates in the direction of arrow A in FIG. 2, that is, the included angle between the top module 52 and the bottom module 54 will be 160 degrees (as shown in FIG. 6). As the top module 52 rotates around the second axis 202 in the direction of arrow B, it also rotates the rotation member 84 around the second axis 202 in the direction of arrow B, and the stop block 68 connected to the track 66 will slide along the path of the track 66 to the position shown in FIG. 5 due to the force exerted by the flexible component 70 connected to the rotation member 84. For clarity, there is no illustration of the flexible component 70 in FIG. 5. Because there is a height difference d between the stop block 68 in its position as shown in FIG. 5 and the stop block 68 in its position as shown in FIG. 4, the stop block 68 in FIG. 5 no longer props up one side of the top module 52, and therefore, the included angle between the top module 52 and the bottom module 54 is able to be adjusted to 180 degrees (as shown in FIG. 7).

Please refer to FIG. 4 with reference to FIG. 5. To return the top module 52 from the condition shown in FIG. 7 back to the unfolded condition shown in FIG. 3, the rotation member 84 will be rotated in the direction opposite arrow B, and the stop block 68 will rotate with the rotation member 84 in the same direction. At the same time, the included angle between the top module 52 and the bottom module 54, which is 180 degrees, will adjust to 160 degrees as shown in FIG. 2.

Although this embodiment of the present invention uses mobile phones for the purpose of illustration, the connection device 56 of the present invention is also applicable to other electronic devices such as a notebook computer.

Compared to the prior art, the connection device 56 of the present invention sets the included angle between the top module 52 and the bottom module 54 to be 160 degrees when the top module 52 is fully lifted, which is desirable for ergonomic reasons, rather than 180 degrees. In addition, the fully lifted top module can still be rotated to make the included angle between the top module 52 and the bottom module 54 become 180 degrees. In doing so, the user can adjust the included angle between the top module 52 and the bottom module 54 to be 160 degrees for ergonomic reasons when conversing using the mobile phone 50 of the present invention. If the user wishes to take a photo with the mobile phone 50, the user can adjust the included angle between the top module 52 and the bottom module 54 to be 180 degrees, which conforms to the ergonomics to take a photo more naturally.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electrical device comprising:
   a top module having a panel for displaying an image;
   a bottom module having a plurality of buttons for controlling the operation of the electrical device;
   a base affixed on the bottom module;
   a pivot, formed on the base, having at least one buckle for coupling the pivot to the top module, wherein the top module is capable of rotating around the buckle;
   a stop block for propping up the top module; and
   a track, surrounding the base, to allow the stop block to move along the track as the top module rotates around the buckle about a first axis;
   wherein as the top mobile rotates around the buckle about the first axis, the stop block undergoes a chance of position along the first axis while sliding on the track.

2. The electrical device of claim 1 further comprising a pivot protection cover for enclosing the pivot and the base.

3. The electrical device of claim 1 wherein the stop block has a groove for propping up one side of the top module as the top module is unfolded.

4. The electrical device of claim 3 wherein the included angle between the top module and the bottom module is substantially near 160 degree when the top module is engaged in the groove of the stop block when it is in the position of the first end of the track.

5. The electrical device of claim 3 wherein the included angle between the top module and the bottom module is substantially 180 degrees as the top module is engaged in the groove in the stop block when it is in the position of the second side of the track.

6. The electrical device of claim 1 further comprising a flexible component, one end of which affixed to the pivot and the other end of which connected to the stop block, for rotating the stop block while the pivot is rotating.

7. The electrical device of claim 6 wherein the flexible component is a spring.

8. The electrical device of claim 1 being a notebook computer.

9. The electrical device of claim 1 being a mobile phone.

* * * * *